US006652829B2

(12) United States Patent
Barnes et al.

(10) Patent No.: US 6,652,829 B2
(45) Date of Patent: Nov. 25, 2003

(54) CONTINUOUS CALCINATION OF MIXED METAL OXIDES

(75) Inventors: Raymond E. Barnes, Wadsworth, OH (US); Richard A. Pipoly, Garfield Heights, OH (US); Ivan H. Joyce, Hudson, OH (US); Javier Garcia Sainz, Castellon (ES)

(73) Assignee: Ferro Corporation, Cleveland, OH (US)

( * ) Notice: Subject to any disclaimer, the term of this patent is extended or adjusted under 35 U.S.C. 154(b) by 56 days.

(21) Appl. No.: 09/928,972

(22) Filed: Aug. 13, 2001

(65) Prior Publication Data

US 2002/0073895 A1 Jun. 20, 2002

Related U.S. Application Data

(63) Continuation-in-part of application No. 09/299,444, filed on Apr. 26, 1999, now abandoned.

(51) Int. Cl.[7] .......................... C01B 13/14; C04B 14/30
(52) U.S. Cl. ................. 423/593.1; 423/595; 423/598; 423/599; 423/600; 423/594.8; 423/594.12; 106/401; 106/450; 106/451; 106/453
(58) Field of Search .................. 423/593.1, 595, 423/598, 599, 600, 594.8, 594.12; 106/400, 401, 450, 451, 453

(56) References Cited

U.S. PATENT DOCUMENTS

| | | | | |
|---|---|---|---|---|
| 3,589,925 A | | 6/1971 | Bell | 106/299 |
| 3,615,810 A | | 10/1971 | Holznagel | 106/304 |
| 3,899,347 A | | 8/1975 | de Ahna et al. | 106/299 |
| 4,047,970 A | * | 9/1977 | Morriss et al. | 106/451 |
| 4,462,793 A | | 7/1984 | Maeda et al. | 423/14 |
| 4,696,700 A | | 9/1987 | Fischer et al. | 106/291 |
| 4,902,485 A | | 2/1990 | Bayer et al. | 423/82 |
| 4,917,735 A | | 4/1990 | Rademachers et al. | 106/428 |
| 4,919,726 A | | 4/1990 | Rademachers et al. | 106/428 |
| 5,228,910 A | | 7/1993 | Joyce et al. | 106/450 |
| 5,496,403 A | | 3/1996 | Gaedcke et al. | 106/400 |
| 5,688,480 A | | 11/1997 | Mohri et al. | 423/263 |
| 5,846,505 A | | 12/1998 | Saegusa | 423/263 |
| 6,114,054 A | | 9/2000 | Klein et al. | 428/689 |

FOREIGN PATENT DOCUMENTS

| | | |
|---|---|---|
| DE | 3242747 | 8/1983 |
| JP | 5761612 | 4/1982 |

* cited by examiner

*Primary Examiner*—M. Alexandra Elve
*Assistant Examiner*—Christina Ildebrando
(74) *Attorney, Agent, or Firm*—Rankin, Hill, Porter & Clark LLP

(57) ABSTRACT

A method for continuously calcinating product to form mixed metal oxide powders comprising providing a continuously operated indirectly heated rotary furnace having a heating cavity, introducing raw feedstock including product to be calcined into the heating cavity of the furnace while the heating cavity is maintained at temperature, and maintaining a controlled atmosphere in the heating cavity during the heating of the feedstock, and discharging and recovering the mixed metal oxide powders.

8 Claims, No Drawings

CONTINUOUS CALCINATION OF MIXED METAL OXIDES

PRIORITY

This application is a continuation-in-part of application Ser. No. 09/299,444 filed Apr. 26, 1999, now abandoned, entitled CONTINUOUS CALCINATION OF MIXED METAL OXIDES.

FIELD OF INVENTION

The present invention relates to a method of producing crystalline powders of mixed metal oxides by a continuous process. More particularly, the crystalline powders are produced by a continuous rotary calcination technique and utilize fugitive flux mineralizers to enhance mutual migration or diffusion of active species. The powders are useful in a variety of applications but particularly as pigments for use in ceramics, paints and plastics.

BACKGROUND

There are many mixed metal oxide compounds that are important in inorganic technology. They are widely used in diverse ceramic applications such as refractories, ferroelectric devices, as inorganic pigments and the like. Of particular interest is the use of mixed metal oxides as inorganic pigments for applications in ceramics, paint and plastics. Typically, in the inorganic pigment industry, classes of pigments that are well recognized are described in a publication of the Color Pigment Manufacturers Association. For these applications it is desirable to produce pigment particles of fine uniform particle size which are phase pure, defect free and offer optimum color values.

Typically, mixed metal oxide inorganic pigments are commercially, although not exclusively, produced by either: (a) a solid-state reaction process involving the wet or dry blending of various metals, oxides or salts, subsequent calcination at elevated temperatures, to ensure that the desired reaction occurs, followed by comminution (or deagglomeration) to the desired size and washing and drying (if required, to remove unwanted salts); or (b) chemical precipitation which may be followed by calcination and subsequent comminution (or deagglomeration) to the desired size and washing and drying (if required to remove unwanted salts); or (c) combinations of both processes.

Modern practice attempts to maximize dry process options in the interests of economy and energy efficiency by batching and dry blending raw materials prior to calcination. The raw materials used are fine powders typically with particle sizes in the range of 0.2 to 50 $\mu$. It is normally not the purpose of the dry blending process to reduce the particle sizes of the constituent powders, but seeks to distribute them evenly. However, dry blending cannot generally produce raw batches that are homogeneous on a submicron scale. The calcinations are typically 0.1 to 24 hours in length to allow for large scale production; however, this is sometimes insufficient to permit complete diffusion of the active species and reaction of the coarser or more refractory raw materials. Calcination can be achieved in periodic, intermittent kilns, or continuous rotary or tunnel kilns. Final size adjustment is achieved by either wet or dry comminution devices which might include ball milling, attrition milling, micropulverization or jet milling. Wet comminution is followed by a drying operation or a filter, wash and drying operation.

The typical pigment manufacturing process described above causes a number of significant problems for the production of high quality pigments. Some common difficulties are achieving complete reaction at readily achievable low calcination temperatures; production of a single phase product; production of fine sized particles; production of narrow particle size distributions; formation of aggregates and large particles which are difficult or impossible to mill down to the desired size; and elimination of grit and large particles (>2 $\mu$ or >10 $\mu$, depending on the pigment application).

It is common practice in the pigments industry, in cases where higher than normal (or preferred) temperatures are required, to ensure that the necessary solid-state reaction takes place by assisting the high temperature reactions by the use of additives (sometimes called fluxes or mineralizers). These additives melt, form eutectics or a reactive vapor phase which is conducive to the formation of the required crystal and/or the mutual migration, or diffusion, of the active species. It is often a further benefit of using such additives that the calcination temperature needed to accomplish the desired reaction is reduced by their use.

The use of fluxes or mineralizers either singly or in combination is largely based on experience because generally there is no reliable manner of predicting which particular mineralizer or combination will enhance the formation of a given color, or amount thereof. Mineralizers are typically employed to enhance liquid phase formation eutectic melt systems and vapor phase reactions. Such mineralizers are typically fluorides, chlorides, sulfates, oxides and other salts which might be used singly or in multiple combinations. Depending upon the application of the pigment, it is frequently necessary to wash the finished pigment to remove residual salts or mineralizers.

One of the limitations of the use of flux mineralizers, particularly those which form fugitive or reactive vapors, is that in order to create the maximum effect, the reactive vapor needs to stay in contact with the pigment batch for a substantial period of the calcination cycle. This requires that the calcination procedure be conducted in a closed container (i.e., a covered or sealed crucible or sagger) to prevent the vapors from escaping at the first opportunity, and to maintain a positive atmosphere of the volatilized flux mineralizer. The calcination itself is, therefore, conducted in a periodic (batch) kiln or continuous tunnel kiln. The use of these materials has, therefore, traditionally precluded the use of continuous (high production rate) rotary kilns when flux mineralizers are required. Also, in conventional processing the nature of the flux mineralizer generally results in it not only reacting with the ingredients of the pigment formulation, but also with the refractory sagger (or crucible). As a result, the full value of the flux mineralizer is often not achieved and the reaction with the sagger refractory material reduces the life (use) cycle of the sagger thereby increasing overall production costs.

In conventional manufacturing in order for the flux mineralizers to be effective in assisting the formation of pigments it is necessary that whether they be gaseous or liquid, they need to be in intimate contact with the powdered ingredients. Good mixing ensures that this occurs for mineralizers that form a melt phase while a sealed sagger system ensures that it occurs when vaporized flux mineralizers are utilized.

SUMMARY OF THE INVENTION

The present invention provides a new and improved method for the manufacture of mixed metals oxide crystalline powders using "fugitive" flux mineralizers in a continuous rotary kiln which avoids the requirement for any granulation or pre-compaction of the raw material feed. The process provides a high quality product at high production rates, and such process minimizes the degree of formation of melts and eutectics, which may in turn plate out onto the furnace wall to form an insulating layer.

In general the present invention provides a method for the synthesis of mixed metal oxide crystalline powders which comprises the steps of preparing a raw material mixture containing at least two different metal cations; adding one or more flux mineralizers and blending it therewith; initiating formation of a mixed metal oxide powder by calcination of the mixture and the flux mineralizer in a continuous indirectly-fired rotary furnace which is capable of entraining the desired atmosphere, whereby the particles of flux mineralizer either melt or vaporize within and around the moving raw material bed charge, displacing the ambient atmosphere and assisting in the formation of the mixed metal oxide particles and thereafter recovering the mixed metal oxide powder.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

PREFERRED EMBODIMENT

The practice of the present invention is primarily directed toward producing inorganic pigments, three examples of which are exemplified herein. Also metastable, high temperature or other crystalline phases that are difficult to synthesize under standard pigment manufacturing temperatures and which benefit by the assistance of flux mineralizer additions may be made via the method of the present invention. Nevertheless, the method is not limited solely to the production of powders having utility as pigments, but is also useful for the production of other mixed metal oxide crystalline powders where the use of flux mineralizers enhances desired crystal formation and/or the mutual migration, or diffusion, of active species.

As noted herein above, this invention is primarily directed toward the production of mixed metal oxide crystalline powders and in particular, pigments. Novelty does not reside alone in the various chemical components, but rather in the ability to control the continuous solid-state synthesis of the particles.

In conventional solid-state production of inorganic pigments, a combination of selected metal oxides are mixed together to form a raw material mixture and then fired in a standard refractory sagger, kiln or other suitable device to produce an inorganic pigment. Such products typically have large particle sizes, on the order of over 10 $\mu$, which must then be milled or ground to a size of about 5 $\mu$ for use in ceramics, or finer for use in paints and plastics.

Continuous rotary calcination offers many advantages over traditional firing techniques of shuttle and tunnel kiln. Continuous rotary calcination offers advantages in term of:

Capability of running large volumes consistently;

Saggerless process (no sagger costs, no sagger handling labor).

No sagger chips (created when saggers are emptied).

Easily automated (feed and discharge)-minimal labor.

Highly suitable for short firing cycle reactions.

Individual particles are heated directly as they roll through the furnace. More heat goes directly into the production of the product instead of heating up costly refractory.

Production rate is controlled by a combination of feed rate, residence time and kiln temperature not purely by the physical size of the kiln and the time taken to heat up and cool down the given volume and refractories.

Since calcination takes place in a tube, in the case of indirect firing, the opportunity is available to control the atmosphere within the furnace.

The process is successful using ungranulated and dry materials—no granulation step is required.

In the case of batch rotary calciners similar advantages exist except that production rates are controlled by the physical size of the furnace and the frequency with which it can be turned around (i.e. heated up; run at soak temperature-discharged and cooled down).

Achieving complete reaction in the formation of a pigment is extremely important. Any unreacted materials or byproducts will likely exhibit a different color which may make the product look duller. To prevent the presence of color contaminating species in the product, some pigments are grossly overfired and must then be extensively ground to achieve an appropriate particle size. Others contain an excess of one of the raw materials, usually one that is white, to force complete reaction of a color contaminating material. The present invention helps significantly in eliminating or minimizing these problems when applied to a continuous rotary calcination process.

The method of the present invention employs an indirectly fired rotary kiln which possesses both multiple heating zones and the capability to entrain the desired atmosphere and minimize ingress of ambient air so that the atmosphere within the furnace can be controlled, either by the addition of gases and vapors, through sealed ports, or by the evolution of gases and vapors from thermal breakdown of powder components within the kiln charge (feedstock) and gas pressure within the furnace being controlled by a suitable pressure relief device when required. The controlled atmosphere of the present method is one that is oxygen depleted and halide rich. Calculations indicate that once the initial furnace atmosphere has been displaced by flux mineralizers vapor (or by a gas/vapor injected from external sources) the ambient air component of internal furnace atmosphere will have been depleted to less than 25% by volume of its original content. The atmosphere in the rotary kiln is subsequently contained, and controlled, by either of the following methods:

A. by totally sealing the system or heating cavity, whereby the entry end of the furnace is closed, and raw material is fed via a volumetric screw-feeder through a sealed port, the screw-feeder itself being submerged within the raw material hopper such that the feedstock helps to provide the desired seal, and the calcined product is discharged through the exit end of the furnace via a gas-tight rotary valve; or B. by partially sealing the system or heating cavity in one of two ways:
  1. whereby the higher (elevated) entrance end of the furnace is sealed as described in A above, but the lower exit end is left open such that the ambient air is displaced down through the exit end by the desired atmosphere which can be generated either from an external source (e.g., a gas lance) or from an internal source via volatile additives (flux mineralizers) incorporated into the raw material batch; or
  2. whereby both the feed and exit ends of the rotary tube are partially closed so that ambient air is displaced but a positive pressure of the desired atmosphere can still be maintained with the furnace using either an external source (e.g., a gas lance) or an internal source via volatile additives (flux mineralizers) incorporated into the raw material batch.

By manipulating these sealing combinations, the atmosphere in the rotary furnace tube can be adjusted as required to provide the most effective atmosphere for the formation of the mixed metal oxide powders or pigment. In all cases, however, time is required to purge the ambient air from the system and allow for mechanical flow and bed depth to stabilize before acceptable color is obtained; this time can be reduced by pre-purging the system with the desired atmosphere before initiating raw material flow through the kiln. The use of multiple heating zones on the rotary kiln allows for the advantageous use of "step-profiles" or temperature gradients within the kiln.

It is preferred practice that the vapor/gaseous atmosphere be generated by incorporating flux mineralizer powder components into the raw batch feedstock. The feedstock preferably comprises from about 0.5% to about 25% by weight flux mineralizer. These flux mineralizers would typically, but not exclusively, include one or more of the following: sodium fluoride, barium fluoride, calcium fluoride, aluminum fluoride, lithium fluoride, potassium fluoride, potassium zirconium fluoride, potassium silico fluoride, sodium silicon fluoride, strontium fluoride, sodium chloride, potassium chloride, sodium sulfate, potassium sulfate, barium sulfate, calcium sulfate, calcium carbonate, sodium carbonate, strontium carbonate, potassium carbonate, ammonium chloride, ammonium nitrate, ammonium molybdate, molybdenum oxide, clays, boric acid, borax, cryolite, magnesium fluoride, trisodium phosphate, diammonium phosphate, alum, antimony oxide, cerium hydrate, titanium dioxide, indium oxide, zinc oxide, feldspar, magnesite, magnesium sulfate, barium carbonate, barium silicofluoride, ammonium sulfate, calcium chloride, rutile, sodium molybdate, tungstic acid, barium zirconium silicate, calcium zirconium silicate and aluminum hydrate. At least one of the flux mineralizers should volatilize to form a reactive vapor phase to assist the mutual migration and diffusion of the active species.

As shown in the examples below, applicants have uncovered surprising combinations of metal oxides and fluxes that avoid the formation of meltphases that cannot be processed on a continuous basis. The formation of meltphases results in product sticking to the equipment and the formation of a thermal insulation effect that prevents adequate heat transfer during the processing of product.

The examples set forth below indicate that while the systems of the present invention can operate in a totally sealed mode, for these particular examples a substantially sealed system that provides minor leakage is preferred to provide ease of adjustment and control of the furnace atmosphere.

The following Examples are intended to illustrate the invention without limiting it in any way.

EXAMPLE 1

An indirectly heated rotary kiln possessing multiple heating zones and equipped with the capability to entrain the desired atmosphere was utilized to process a homogeneous mixture of the following formulation:

| | |
|---|---|
| 54.9 wt % $ZrO_2$ | (Fine size/commercial grade) |
| 5.9 wt % $V_2O_5$ | (Commercial grade) |
| 2.0 wt % $K_2ZrF_6$ | (Commercial grade) - flux mineralizer |
| 10.0 wt % $K_2SO_4$ | (Commercial grade) - flux mineralizer |
| 27.2 wt % $SiO_2$ | (Fine size/commercial grade) |

Rotary kiln operational conditions were established to provide material temperature residence time of from 30 minutes to 90 minutes, with maximum operating temperatures ranging from 800° C. to 1100° C. The tube was operated in a semi-open configuration with flux/mineralizer generated atmosphere outgassing being allowed exclusively on the discharge end of the equipment.

After discharge the calcined product was cooled, washed and milled. A blue pigment with good saturation and strength in ceramic applications was obtained.

EXAMPLE 2

A homogeneous mixture of the following formulation was introduced into the kiln described and operated as stated in Example 1:

| | |
|---|---|
| 57.4 wt % $ZrO_2$ | (Fine size/commercial grade) |
| 5.8 wt % $Pr_6O_{11}$ | (Commercial grade) |
| 4.7 wt % $BaSiF_6$ | (Commercial grade) - flux mineralizer |
| 3.4 wt % NaCl | (Commercial grade) - flux mineralizer |
| 28.7 wt % $SiO_2$ | (Fine size/commercial grade) |

After discharge the calcined product was cooled, washed and milled. A yellow pigment with good saturation and strength in ceramic applications was obtained.

EXAMPLE 3

A homogeneous mixture of the following formulation was introduced into the kiln described and operated as stated in Example 1:

| | |
|---|---|
| 87.1 wt % Gamma $Al_2O_3$ | (Fine size/commercial grade) |
| 9.7 wt % $MnO_2$ | (Fine size/commercial grade) |
| 1.2 wt % $CaF_2$ | (Fine size/commercial grade) - flux mineralizer |
| 1.0 wt % NaCl | (Commercial grade) - flux mineralizer |
| 1.0 wt % $Cr_2O_3$ | (Fine size/commercial grade) |

After discharge the calcined product was cooled and milled. A pink pigment with good saturation and strength in ceramic body applications was obtained.

EXAMPLE 4

A homogenous mixture of the following formulation was introduced into the kiln described and operated as stated in Example 1:

| | |
|---|---|
| 54.9 wt % $ZrO_2$ | (Fine size/commercial grade) |
| 5.9 wt % $V_2O_5$ | (Commercial grade) |
| 2.0 wt % $BaSiF_6$ | (Commercial grade) - flux mineralizer |
| 10.0 wt % $K_2SO_4$ | (Commercial grade) - flux mineralizer |
| 27.2 wt % $SiO_2$ | (Fine size/commercial grade) |

Rotary kiln operational conditions were established to provide material temperature residence time of from 30 minutes to 90 minutes, with maximum operating temperatures ranging from 800° C. to 1100° C. The tube was operated in a semi-open configuration with flux/mineralizer generated atmosphere outgassing being allowed exclusively on the discharge end of the equipment.

After discharge the calcined product was cooled, washed and milled. A blue pigment with good saturation and strength in ceramic applications was obtained.

Based upon the foregoing disclosure, it should now be apparent that the use of the method described herein will carry out the objects set forth herein above.

As noted herein above, the production of competitively priced pigments requires the use of relatively inexpensive raw materials, inexpensive processing steps, minimal labor, and short product processes. Due to these limitations, most pigments are made by the general process of batching, wet or dry blending, calcining, and grinding operations. The raw materials used are fine powders, typically with particle sizes in the range of 0.2 to 50 $\mu$. The dry blending process is not primarily used to reduce the particle sizes of the powders, and generally cannot produce raw batches which are homogeneous on the submicron scale.

The calcinations are typically 0.1 to 24 hours long to allow for large scale production, which is often insufficient to permit complete diffusion and reaction of the coarser or more refractory raw materials. Grinding is done by a variety of methods, including micropulverization, jet milling, ball milling and attrition milling. The wet grinding methods are followed by either a drying operation or a filter, wash and dry process.

The present invention helps alleviate one or more of the above noted problems for those pigment systems which utilize flux mineralizer additions to assist color formation and migration and diffusion of active species. A most important benefit of the present invention is that it allows for continuous rotary calcination of products which need the assistance of flux mineralizers to enhance color formation and migration and diffusion of active species. Continuous rotary calcination used in this manner alleviates the need for pregranulation of the raw batch as commonly suggested, eliminates the need for costly saggers and labor for sagger loading and handling, and provides for economy of scale for large production volumes by providing the opportunity for streamlined fully integrated continuous production. The ability to facilitate reactions at lower temperatures and the shorter overall calcination times is extremely important. Since it allows for the use of refractory metal tubes instead of ceramic tubes which would react with the flux mineralizers and cause adhesion to the furnace walls, it contributes to producing finer powder particle sizes and reduces aggregation and interparticle necking. It also eliminates grit and larger particles being generated by conventional refractory sagger handling systems.

The combination of this technology in conjunction with assignee's template technology as described in U.S. Pat. No. 5,228,910 provides the ability to control the size, crystallinity and shape of the product by the amount or type of the template used and has far reaching implications, including the production of magnetic, conducting, and superconducting of or semiconducting media. In the case of mixed metal oxide pigments, the size, crystallinity and shape thereof greatly influence the optical properties of the pigmented system. In addition, the size, crystallinity and shape, together with the presence of crystalline surface defects affect their dissolution rates in glazes and affect the interfacial reactions that occur in all systems. In particular, the rates of interfacial reactions can affect the degradation rates or stability of the paint and plastic systems in which mixed metal oxide powders are used. Applicants hereby incorporate by reference the teachings of U.S. Pat. No. 5,228,910

It should also be apparent to those skilled in the art that the method of the present invention can be practiced to manufacture a variety of crystalline powders having utility as pigments for ceramics, plastics and paints as well as other uses including superconductors, semiconductors, ferroelectrics, dielectrics, piezoelectrics, refractories, catalysts, grinding media, abrasives and the like. Similarly, the selection of components to form the crystalline powders as well as selection of flux mineralizer can readily be made within the total specification disclosure. Relative amounts of the components can be varied depending upon the compositional and structural (i.e., both morphologic, or shape, and crystal structure) results sought. In addition to the chromophore employed in the case of a pigment composition, crystal size and shape (morphology) and crystal structure are important in producing the desired color. In similar fashion it is to be appreciated that many of the process steps of the present method are generally conventional and thus can be readily determined by those skilled in the art.

It is, therefore, to be understood that any variations evident fall within the scope of the claimed invention and thus, the selection of the specific metal oxides can be determined without departing from the spirit of the invention herein disclosed and described. Moreover, the scope of the invention shall include all modifications and variations that may fall within the scope of the attached claims.

What is claimed is:

1. A method for continuously calcinating product to form mixed metal oxide pigments comprising:
   (i) providing a continuously operated indirectly heated rotary furnace having a heating cavity;
   (ii) introducing raw ungranulated batch pigment precursor feedstock including from about 0.5% to about 25% by weight flux mineralizer and product to be calcined into said heating cavity of said furnace while said heating cavity is maintained at a temperature of from about 1600° F. to about 2300° F., said flux mineralizer providing at least in part a controlled atmosphere during heating, the controlled atmosphere comprising an atmosphere that is depleted of oxygen and is halogen rich and comprises less than 25% by volume ambient air;
   (iii) maintaining the controlled atmosphere by at least partially sealing the heating cavity to promote the calcination of at least a portion of said product in said heating cavity during the heating of said feedstock thereby forming mixed metal oxide pigments; and
   (iv) discharging and recovering the mixed metal oxide pigments;
   wherein said product to be calcined comprises a mixture of oxides of zirconium, vanadium and silicon, and said flux mineralizer comprises a mixture of $K_2ZrF_6$ and $K_2SO_4$, and said method renders a blue pigment.

2. A method as set forth in claim 1 wherein said mixture of metal oxides comprises $ZrO_2$, $V_2O_5$ and $SiO_2$.

3. A method for continuously calcinating product to form mixed metal oxide pigments comprising:
   (i) providing a continuously operated indirectly heated rotary furnace having a heating cavity;
   (ii) introducing raw ungranulated batch pigment precursor feedstock including from about 0.5% to about 25% by weight flux mineralizer and product to be calcined into said heating cavity of said furnace while said heating cavity is maintained at a temperature of from about 1600° F. to about 2300° F., said flux mineralizer providing at least in part a controlled atmosphere during heating, the controlled atmosphere comprising an atmosphere that is depleted of oxygen and is halogen rich and comprises less than 25% by volume ambient air;
   (iii) maintaining the controlled atmosphere by at least partially sealing the heating cavity to promote the calcination of at least a portion of said product in said heating cavity during the heating of said feedstock thereby forming mixed metal oxide pigments; and (iv) discharging and recovering the mixed metal oxide pigments;

wherein said product to be calcined comprises a mixture of oxides of zirconium, praseodymium and silicon, and said flux mineralizer comprises a mixture of $BaSiF_6$ and NaCl, and said method renders a yellow pigment.

4. A method as set forth in claim 3 wherein said mixture of metal oxides comprises $ZrO_2$, $Pr_6O_{11}$ and $SiO_2$.

5. A method for continuously calcinating product to form mixed metal oxide pigments comprising:

(i) providing a continuously operated indirectly heated rotary furnace having a heating cavity;

(ii) introducing raw ungranulated batch pigment precursor feedstock including from about 0.5% to about 25% by weight flux mineralizer and product to be calcined into said heating cavity of said furnace while said heating cavity is maintained at a temperature of from about 1600° F. to about 2300° F., said flux mineralizer providing at least in part a controlled atmosphere during heating, the controlled atmosphere comprising an atmosphere that is depleted of oxygen and is halogen rich and comprises less than 25% by volume ambient air;

(iii) maintaining the controlled atmosphere by at least partially sealing the heating cavity to promote the calcination of at least a portion of said product in said heating cavity during the heating of said feedstock thereby forming mixed metal oxide pigments; and (iv) discharging and recovering the mixed metal oxide pigments;

wherein said product to be calcined comprises a mixture of oxides of aluminum, manganese and chromium, and said flux mineralizer comprises a mixture of $CaF_2$ and NaCl, and said method renders a pink pigment.

6. A method as set forth in claim 5 wherein said mixture of metal oxides comprises $Al_2O_3$, $MnO_2$ and $Cr_2O_3$.

7. A method for continuously calcinating product to form mixed metal oxide pigments comprising:

(i) providing a continuously operated indirectly heated rotary furnace having a heating cavity;

(ii) introducing raw ungranulated batch pigment precursor feedstock including from about 0.5% to about 25% by weight flux mineralizer and product to be calcined into said heating cavity of said furnace while said heating cavity is maintained at a temperature of from about 1600° F. to about 2300° F., said flux mineralizer providing at least in part a controlled atmosphere during heating, the controlled atmosphere comprising an atmosphere that is depleted of oxygen and is halogen rich and comprises less than 25% by volume ambient air;

(iii) maintaining the controlled atmosphere by at least partially sealing the heating cavity to promote the calcination of at least a portion of said product in said heating cavity during the heating of said feedstock thereby forming mixed metal oxide pigments; and (iv) discharging and recovering the mixed metal oxide pigments;

wherein said product to be calcined comprises a mixture of oxides of zirconium, vanadium and silicon, and said flux mineralizer comprises a mixture of $BaSiF_6$ and $K_2SO_4$, and said method renders a blue pigment.

8. A method as set forth in claim 7 wherein said mixture of metal oxides comprises $ZrO_2$, $V_2O_5$ and $SiO_2$.

* * * * *